Aug. 28, 1945.  E. C. WILLIAMS  2,383,756
TESTING DEVICE FOR CONTROL THERMOSTATS
Filed Dec. 4, 1943   2 Sheets-Sheet 1
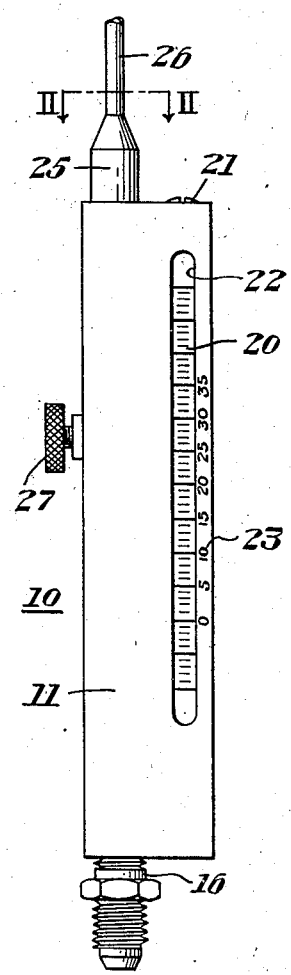
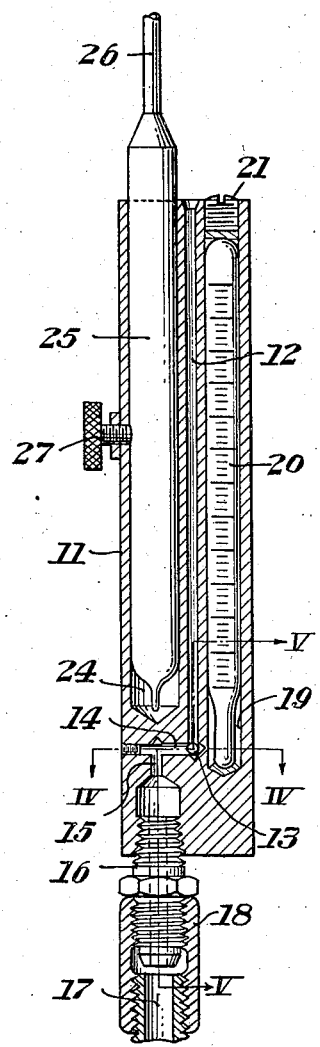
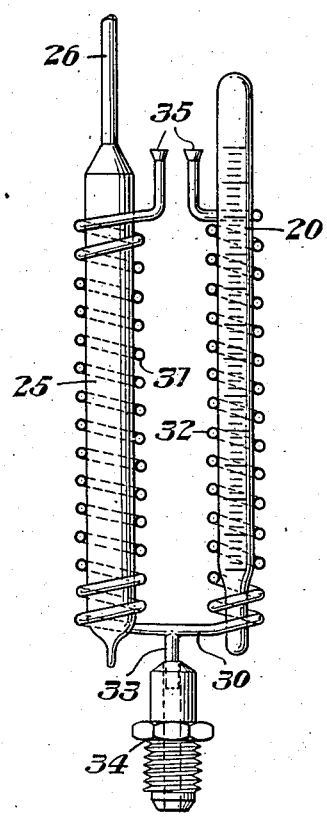
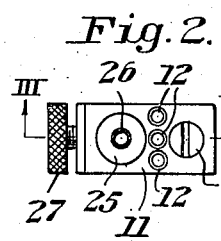
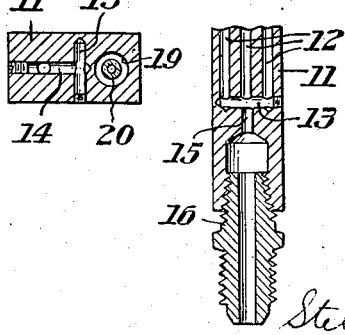
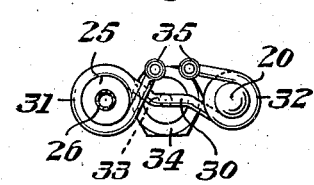
INVENTOR
Emmett C. Williams
by his attorneys
Stebbins, Blenko & Webb Aug. 28, 1945.  E. C. WILLIAMS  2,383,756
TESTING DEVICE FOR CONTROL THERMOSTATS
Filed Dec. 4, 1943  2 Sheets-Sheet 2

INVENTOR
Emmett C. Williams
by his attorneys
Stebbins, Blenko & Webb

Patented Aug. 28, 1945

2,383,756

UNITED STATES PATENT OFFICE 2,383,756

TESTING DEVICE FOR CONTROL THEMOSTATS

Emmett C. Williams, Pittsburgh, Pa.

Application December 4, 1943, Serial No. 512,900

8 Claims. (Cl. 73—1)

This invention relates generally to testing devices and, in particular, to devices for testing control thermostats and determining the accuracy of the adjustment thereof.

Control thermostats are widely used in numerous applications and in various different types. One of these types, i. e., the expansible-fluid variety, is used almost universally in domestic refrigerators of the electrically operated type for starting and stopping the compressor motor. These refrigerator thermostats exhibit a tendency to get out of adjustment and require resetting in order to maintain the interior of the refrigerator within the desired temperature limits. It has been necessary heretofore to remove the thermostat entirely from the refrigerator and take it to a testing laboratory having facilities for determining the temperatures at which the thermostat operates the usual control switch or relay from off to on positions and vice versa. This is sometimes very inconvenient and always involves additional delay and expense.

I have invented a novel device which is readily portable, whereby the thermostat of a refrigerator or other device, and particularly thermostats of the expansible-fluid type, may be easily tested in the field, without removal from the apparatus controlled thereby, in order to determine the temperatures at which the thermostat operates its control switch. In a preferred embodiment, my invention comprises an expansion duct or chamber adapted to be connected to a source of gas under pressure greater than that of the atmosphere, and receptacles or sockets for a suitable thermometer and the bulb of a thermostat of the expansible-fluid type. By exhausting compressed gas through the expansion duct or chamber, I effect sufficient local cooling to reduce the temperature of the fluid in the bulb below the minimum for which the thermostat is adjusted. This temperature may be determined by reading the thermometer when the sound characteristic of the thermostat operation is heard. When the minimum temperature for which the thermostat is set has been determined, the supply of gas to the expansion duct or chamber is terminated and the testing device is heated as by being held in the hand, until the operation of the thermostat at the other end of the temperature range is heard. This temperature is also noted and appropriate adjustment is then made as may be required.

My invention may take various forms, some of which are illustrated in the accompanying drawings and will be described in detail hereinbelow. In one form, a metal block has an expansion duct system therein and is also provided with sockets for receiving the thermostat bulb and a thermometer. In another form, the expansion duct is in the form of a helical tube providing a coil having portions adapted to receive the thermostat bulb and thermometer. In a still further form, I provide a cylindrical expansion chamber having a plate extending radially therefrom and thermometer and bulb receiving sockets secured to the plate. In the drawings, Figure 1 is a side elevation of one form of the invention;

Figure 2 is a plan view with a portion in section along the plane of line II—II of Figure 1;

Figure 3 is a vertical transverse section along the plane of line III—III of Figure 2;

Figure 4 is a transverse sectional view along the plane of line IV—IV of Figure 3;

Figure 5 is a transverse section taken along the plane of line V—V of Figure 3;

Figure 6 is a side elevation of a modified form;

Figure 7 is a plan view thereof;

Figure 10:
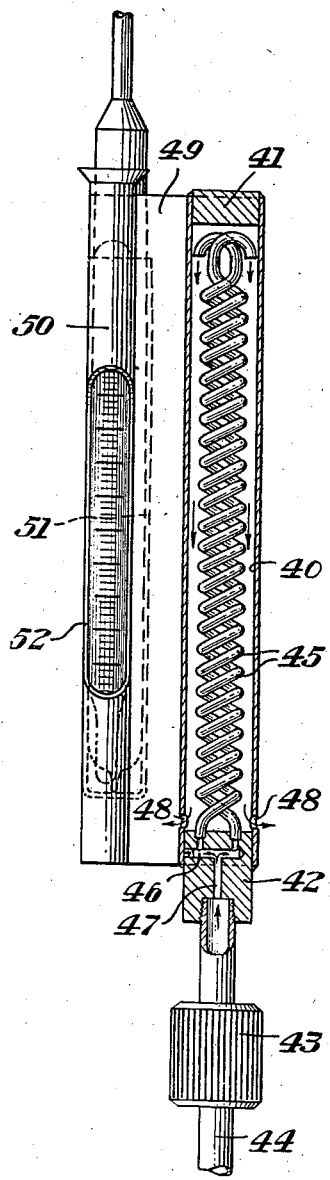
Figure 10 is a side elevation looking from the side opposite that shown in Figure 8 with a portion in section along the plane of line X—X of Figure 9.

Referring now in detail to the drawings and, for the present, to Figures 1 through 5, my testing device as illustrated therein, indicated generally at 10, comprises a block 11 of metal, preferably having a high thermal conductivity, such as brass or the like. Expansion ducts or chambers 12 are drilled into the block from one end thereof to points adjacent the other end. A cross passage 13 drilled inwardly from one side of the block and then plugged, intersects the lower ends of the duct 12. A cross passage 14 at right angles to the passage 13 is drilled inwardly from one edge of the block and then plugged. A passage 15 drilled inwardly from the lower end of the block intersects the passage 14 and is enlarged to receive a threaded fitting 16. By means of the fitting 16 a supply pipe 17 is connected, as by a coupling 18. The pipe 17 extends to a portable source of any suitable gas under superatmospheric pressure, e. g., 15 or 20 lbs. per square inch. The source of gas may be a portable tank or receptacle having a built-in manually operated pump.

On one side of the passages 12 the block 11 is bored longitudinally as at 19 providing a socket adapted to receive a thermometer 20. The thermometer socket is preferably closed by a removable plug 21. If desired, metal packing may be placed in the bottom of the bore 19 to insure prompt equalization of the temperature of the thermometer bulb with that of the block 11. The block 11 has a slot 22 along one side thereof opening into the thermometer socket whereby the scale of the latter may be observed. For convenience in reading the thermometer, the thermometer scale may be reproduced along the exterior of the block 11 adjacent the slot 22 as indicated at 23.

A longitudinal bore 24 is formed in the block 11 adjacent the ducts 12 and on the opposite side thereof from the bore 19. The bore 24 is adapted to receive a bulb 25 forming part of the thermostat of the expansible-fluid type. It will be understood that, in addition to the bulb 25, this type of thermostat includes a capillary tube 26 and a bellows or other expansible chamber, not shown, for actuating a suitable control device such as an electric switch. A thumb screw 27 threaded into a tapped hole drilled in from one side of the block and intersecting the bore 24, secures the bulb 25 in its socket.

It will be understood that a suitable control valve is provided in the connection 17 or at the compressed air tank.

When it is desired to test the setting of a thermostat, it is only necessary to insert the bulb 25 thereof in the bore or socket 24 and admit compressed gas to the ducts 12 through the connection 17 assuming the thermometer to have been previously placed in its socket or bore 19. Control thermostats are usually so positioned in respect to the apparatus they control that access may be had to the bulb which is subjected to the temperature which controls the operation in question, without dismantling the thermostat or removing it from the apparatus.

The exhausting of compressed air or other gas through the expansion ducts 12 to the atmosphere effects local cooling of the block 11 sufficient to bring the temperature thereof down below the minimum value at which the thermostat being tested is designed to operate. In the case of refrigerator thermostats, they are usually set to shut off the compressor motor when the temperature within the refrigerator is about 35° F. although lower temperatures may be obtained by means of the manually operable thermostat adjustment usually included in a refrigerator control mechanism. In any event, when the block 11 has been chilled sufficiently by expansion of compressed gas to cause operation of the thermostat at its lower temperature limit, this operation may be detected by the resulting sound in the control mechanism and the temperature at which it occurred observed on the thermometer 20. It will be apparent that the thermometer and thermostat bulb are subject substantially equally to the cooling effect of the expansion of gas occurring in the ducts 12 whereby the thermometer correctly indicates the temperature at which the thermostat operates.

After determining the minimum temperature at which the thermostat is set to operate, the compressed gas is shut off and the temperature of the block 11 is increased. This may conveniently be done by grasping it in the hand whereby sufficient body heat is transmitted to the block to raise its temperature to the maximum value at which the thermostat is set to operate. As the block is warmed, the operation of the thermostat at the upper limit of its range may then be detected by the noise of its mechanism and the temperature at which the operation occurs noted on the thermometer 20. Having thus determined the upper and lower limits of temperature at which the thermostat operates, an appropriate adjustment may be made by known means, as may be necessary to "spot" the operating temperatures of the thermostat at the desired points. A repeated test may then be made in the manner above described, to verify the correctness of the final adjustment and further adjustment made if needed.

Figures 6 and 7 illustrate a modified form of the invention in which an expansion duct 30 in the form of a small tube is wound helically, forming coils 31 and 32. A T connection 33 from the duct 30 has a fitting 34 thereon for the connection of a supply pipe such as that shown at 17 leading to a source of compressed gas. The coils 31 and 32 have their free ends open to the atmosphere as indicated at 35. The coils themselves serve as receivers or sockets for the thermometer 20 and thermostat bulb 25.

The operation of the form of the invention shown in Figures 6 and 7 is the same as that of the embodiment shown in Figures 1, 3, and 5 except that the cooling effect produced by the expansion of the gas, as it is exhausted to atmosphere through the coils 31 and 32, is transmitted directly to the thermometer and thermostat bulb through the wall of the tube of which the coils themselves are formed. Since the tube 30 is of the same size in both the coils 31 and 32, the cooling effect of the expansion of gas occurring therein is substantially the same so that the temperature indicated by thermometer 20 is, substantially the temperature of the bulb 25.

Figure 9:
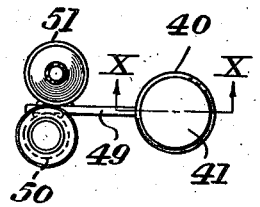
Figure 9 is a plan view thereof with a part in section along the plane of line IX—IX of Figure 8.
Figure 8:
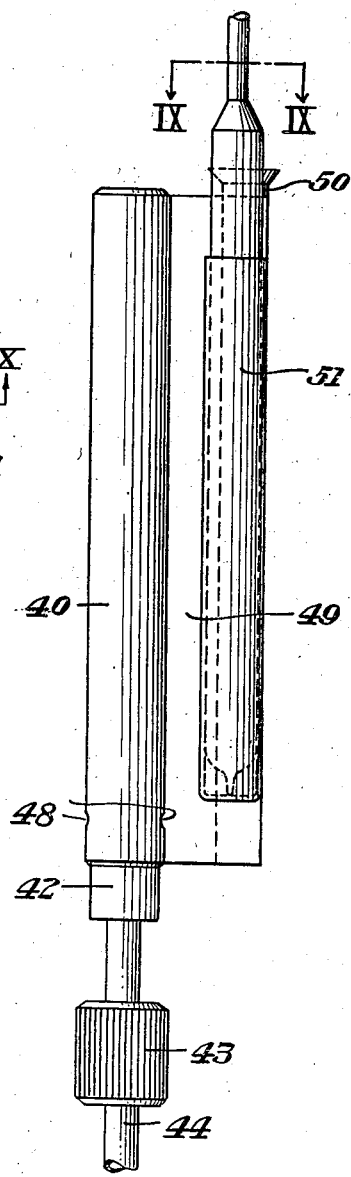
Figure 8 is a side elevation of a further modification.

Figures 8 through 10 illustrate a further form of the invention which includes an expansion chamber 40 preferably in the form of a cylindrical tube having a closure 41 in one end thereof. A plug 42 in the other end is adapted to be connected, as by a coupling 43 to a pipe 44 extending from a source of gas under pressure. Helical coils 45 of small tube are disposed in the chamber 40 and are connected at one end to passages in the plug 42 communicating with transverse and longitudinal passages 46 and 47 therethrough. The tubes forming the coils 45 are open at their other end and exhaust ports 48 are formed in the wall of the chamber 40 near the plug 42.

From the foregoing, it will be apparent that on opening of a suitable control valve, compressed gas flows through the pipe 44, the passages 47 and 46 and the coils 45 and is then discharged on the inside of the chamber 40 through which it flows in the direction indicated by the arrows, along the length of the chamber and out through the ports 48.

A plate 49 composed of material such as brass or copper having a high thermal conductivity is secured to the chamber 40 and extends radially therefrom. Thermometer and thermostat-bulb sockets 50 and 51 are secured to the plate 49 on opposite sides thereof in spaced relation to the chamber 40, the sockets being about equally distant from the chamber. A slot 52 in the thermometer socket 50 permits the reading of the thermometer to be observed without removing it from the socket. The cooling effect produced in the chamber 40 by the expansion of compressed gas in the coils 45 and on the interior of the chamber after discharge from the coils, causes the cooling of the thermometer and thermostat-bulb sockets by the absorption of heat therefrom through the plate 49. The temperatures of the thermometer and bulb are substantially identical at all times so that the reading of the thermometer accurately indicates the temperatures at which the operations of the thermostat occur, as revealed by the noise of the operation in the control mechanism.

It will be apparent that the invention provides a simple yet highly effective means for testing thermostats of the expansible-fluid type to verify the correctness of their adjustment. The device and its associated apparatus are easily portable and relatively inexpensive. At the same time, the accuracy with which thermostat settings may be determined by the invention is sufficient for all practical purposes. As previously pointed out, the invention avoids the considerable inconvenience, delay, and additional expense which have been involved heretofore by the necessity of removing the thermostat entirely from the apparatus it controls, in order to make an accurate check of the setting thereof.

Although I have illustrated and described but a preferred embodiment of the invention with a few modifications, it will be apparent to those skilled in the art that the invention is susceptible of embodiment in various other forms utilizing the principle hereinabove explained, and without departing from the scope of the appended claims.

I claim:

1. A device for testing control thermostats comprising an expansion chamber, a connection for supplying compressed gas to said chamber for expansion therein, a heat-conducting plate secured to said chamber, a thermometer mounted on said plate and a socket for receiving the bulb of an expansible-fluid thermostat, said socket being mounted on said plate in spaced relation to said chamber.

2. A device for testing control thermostats comprising an expansion chamber, a connection for supplying compressed gas to said chamber for expansion therein, a heat-conducting plate secured to said chamber, a thermometer mounted on said plate and a socket for receiving the bulb of an expansible-fluid thermostat, said socket and thermometer being mounted on said plate on opposite sides thereof and substantially equally spaced from said chamber.

3. A device for testing control thermostats comprising an exhaust tube for expanding compressed gas, a connection from said tube to a source of compressed gas, said tube having portions of helical conformation providing coils adapted to receive, respectively, a thermometer and the bulb of an expansible-fluid thermostat.

4. A device for testing control thermostats comprising a metal block having a gas exhaust passage extending longitudinally therethrough, means for connecting one end of the passage to a source of compressed gas, said block being provided with a pair of sockets in intimate heat-exchange relation with the gas exhaust passage and with each other adapted respectively to receive a thermometer and the thermo-responsive element of a thermostat.

5. A device for testing control thermostats comprising an exhaust tube forming a chamber for expanding compressed gas, a connection from said tube to a source of compressed gas, a thermometer support, and a receptacle for the thermo-responsive element of a thermostat, and means mounting both said support and said receptacle in intimate heat-exchange relation with each other and said tube.

6. A device for testing control thermostats comprising a tube having a length several times its diameter adapted to provide a chamber for expanding compressed gas, a connection from said tube to a source of compressed gas, a thermometer support, a socket for the thermo-responsive element of a thermostat, and means mounting said support and socket in intimate heat-exchange relation with each other and with said tube.

7. A device for testing control thermostats comprising a metal block having a gas exhaust passage therethrough adapted to expand compressed gas to atmosphere, means for connecting said passage to a source of compressed gas, a socket formed in said block adapted to receive a thermometer and a further socket formed in said block adapted to receive the bulb of an expansible-fluid thermostat, said sockets being subject substantially equally to the cooling effect produced by the expansion of the gas in said passage.

8. A device for testing control thermostats comprising metal means providing a thermometer support and a thermostat-bulb socket, said means also having a fluid-expansion chamber in heat-exchange relation with said support and socket, and means for connecting said chamber to a source of compressed gas.

EMMETT C. WILLIAMS.